(12) United States Patent
Takeda et al.

(10) Patent No.: US 7,281,858 B2
(45) Date of Patent: Oct. 16, 2007

(54) OPTICAL CONNECTOR WHICH CAN BE ASSEMBLED WITHOUT USING SCREW PARTS

(75) Inventors: Jun Takeda, Tokyo (JP); Yuichi Koreeda, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 11/320,085

(22) Filed: Dec. 28, 2005

(65) Prior Publication Data

US 2006/0140545 A1 Jun. 29, 2006

(30) Foreign Application Priority Data

Dec. 28, 2004 (JP) .............................. 2004-380873

(51) Int. Cl.
G02B 6/38 (2006.01)
(52) U.S. Cl. .............................. 385/60; 385/55; 385/59
(58) Field of Classification Search ............ 385/53–56, 385/58–68, 70–72, 76–85
See application file for complete search history.

(56) References Cited

U.S. PATENT DOCUMENTS

| 6,254,278 | B1 * | 7/2001 | Andrews et al. .............. 385/53 |
|---|---|---|---|
| 6,361,218 | B1 * | 3/2002 | Matasek et al. .............. 385/60 |
| 6,447,172 | B1 * | 9/2002 | Stephenson et al. .......... 385/70 |
| 6,471,414 | B2 * | 10/2002 | Carberry et al. .............. 385/53 |
| 6,524,014 | B2 * | 2/2003 | Stephenson et al. .......... 385/55 |
| 6,554,484 | B2 * | 4/2003 | Lampert et al. .............. 385/70 |
| 6,572,276 | B1 * | 6/2003 | Theis et al. ................... 385/78 |
| 6,715,928 | B1 * | 4/2004 | Matasek et al. .............. 385/56 |
| 6,755,574 | B2 * | 6/2004 | Fujiwara et al. .............. 385/56 |
| 6,945,704 | B2 * | 9/2005 | Yamaguchi ................... 385/60 |
| 2003/0002808 | A1 * | 1/2003 | Lampert et al. .............. 385/70 |

FOREIGN PATENT DOCUMENTS

| JP | 61-99106 U | 6/1986 |
|---|---|---|
| JP | 10-197759 | 7/1998 |
| JP | 10311933 | 11/1998 |

* cited by examiner

Primary Examiner—Kevin S. Wood
(74) Attorney, Agent, or Firm—Collard & Roe, P.C.

(57) ABSTRACT

In an optical connector, a holding member is coupled to a ferrule and attached to a housing. The ferrule has a flange portion brought into contact with the contact surface. The ferrule is adapted to receive an optical fiber. The housing has a contact surface and an engaging surface faced inward with respect to each other in an optical axis direction. The holding member includes a cylindrical main body for receiving the ferrule inserted therein, a first engaging portion connected to the main body and engaged with the engaging surface, and a second engaging portion connected to the main body and engaged with the flange portion, the second engaging portion being elastically deformable.

10 Claims, 2 Drawing Sheets

OPTICAL CONNECTOR WHICH CAN BE ASSEMBLED WITHOUT USING SCREW PARTS

This application claims priority to prior Japanese patent application JP 2004-380873, the disclosure of which is incorporated herein by reference.

BACKGROUND OF THE INVENTION

This invention relates to an optical connector for use in establishing optical connection. In the present specification and the appended claims, the "optical connector" should be broadly understood so as to include an optical adapter, an optical splicing module, and the like used in an optical connection.

For example, Japanese Unexamined Patent Application Publication (JP-A) No. H10-311933 discloses a waterproof optical connector. The optical connector comprises a cylindrical shell member, an insulator received in the shell member and held by the shell member, a ferrule coupled to the insulator, and a holding member for holding the ferrule in cooperation with the insulator. The holding member is coupled to the insulator by the use of screw parts.

With such a coupling structure, however, it is difficult to meet a recent demand for reduction in size and simplicity in assembling.

SUMMARY OF THE INVENTION

It is therefore an object of this invention to provide an optical connector which is easy in assembling and disassembling.

Other objects of the present invention will become clear as the description proceeds.

According to an aspect of the present invention, there is provided an optical connector comprising a housing having a contact surface and an engaging surface faced inward with respect to each other in an optical axis direction, a ferrule having a flange portion brought into contact with the contact surface, the ferrule being adapted to receive an optical fiber; and a holding member coupled to the ferrule and attached to the housing, the holding member comprising a cylindrical main body for receiving the ferrule inserted therein, a first engaging portion connected to the main body and engaged with the engaging surface, and a second engaging portion connected to the main body and engaged with the flange portion, the second engaging portion being elastically deformable.

DESCRIPTION OF THE PREFERRED EMBODIMENT

Figure 1:
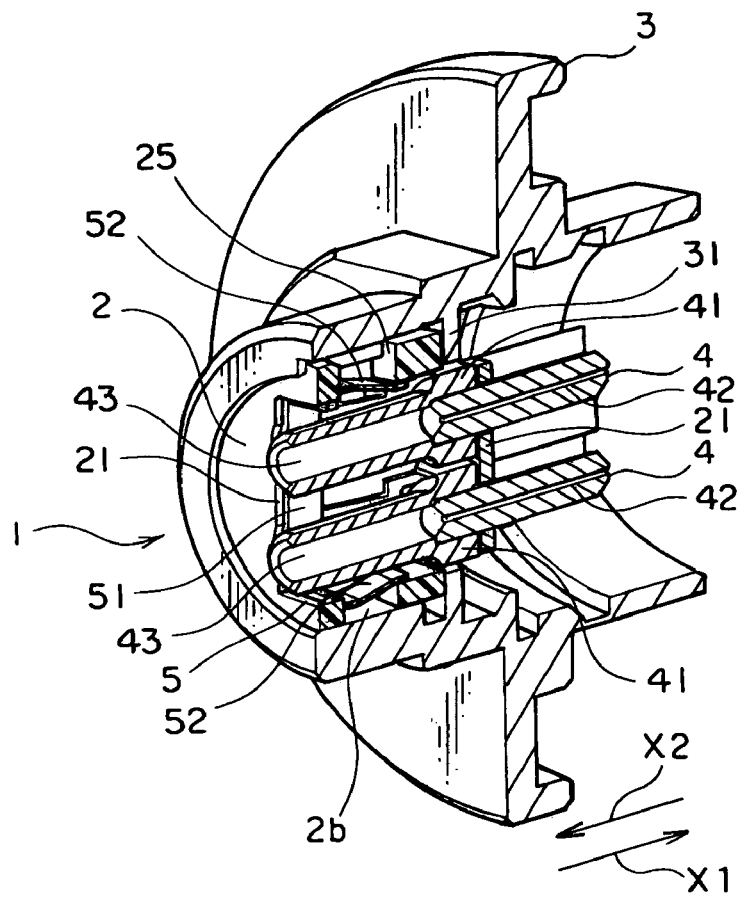
FIG. 1 is a half section perspective view of an optical connector according to an embodiment of this invention.
Figure 2:
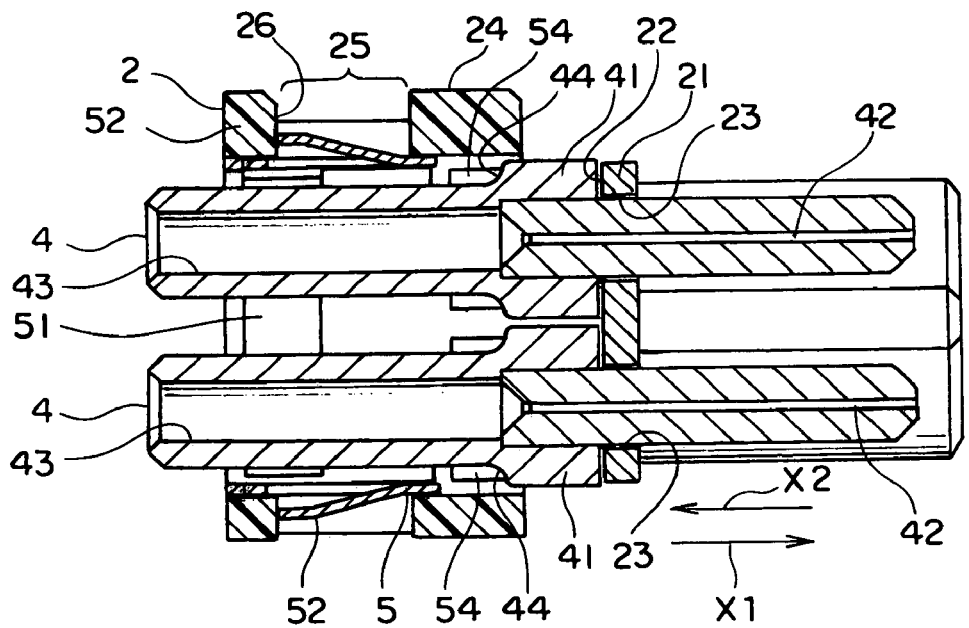
FIG. 2 is an enlarged sectional view showing an internal structure of the optical connector in FIG. 1.
Figure 3:
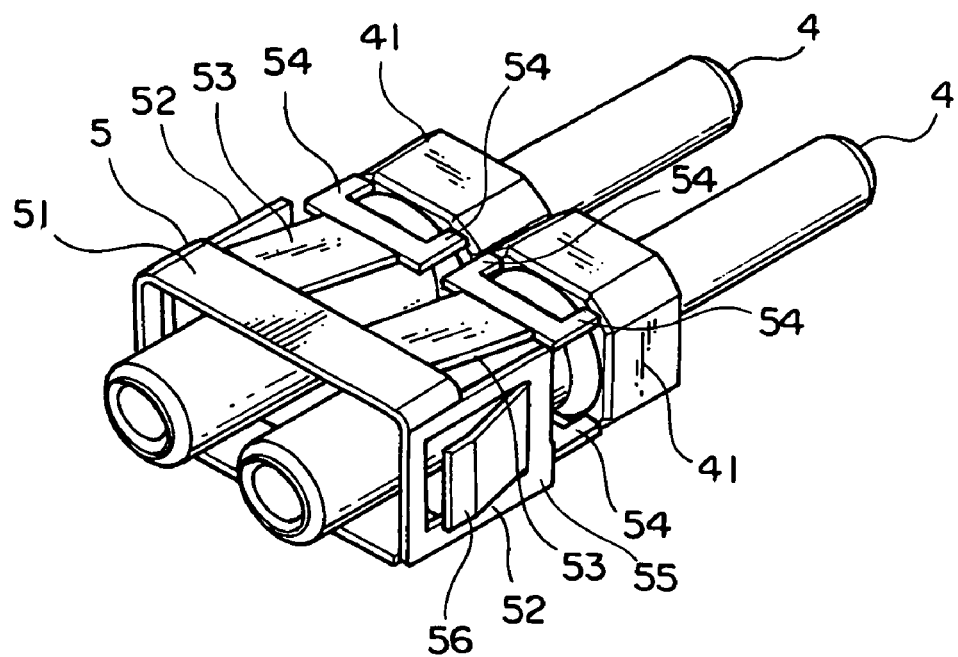
FIG. 3 is a perspective view of an assembly of a ferrule and a stopper of the optical connector illustrated in FIG. 1.
Figure 4:
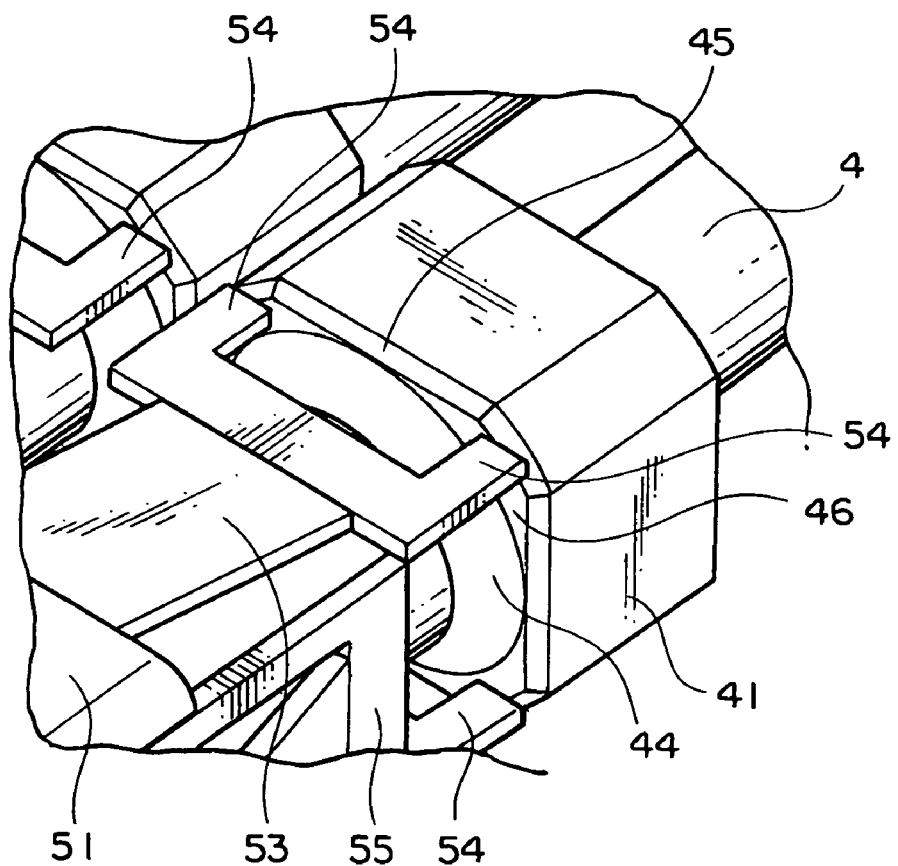
FIG. 4 is an enlarged view of a characteristic part in FIG. 3.

Referring to FIGS. 1 to 4, description will be made of an optical connector according to an embodiment of this invention.

The optical connector is depicted at 1 in the figure and is a connector of a two-pin receptacle structure. The optical connector 1 comprises a housing 2 made of insulating material and having a cylindrical outer peripheral surface, a shell 3 made of conductive material and having a cylindrical inner surface surrounding the outer peripheral surface of the housing 2, two ferrules 4 made of ceramics material, and a holding member or a stopper 5 holding the ferrules 4 and attached to an internal cavity 21 of the housing 2. The stopper 5 is made of a metal plate.

Each of the ferrules 4 has a flange portion 41 protruding from its outer peripheral surface, a narrow hole 42 extending along an optical axis in optical axis directions X1 and X2 for receiving an optical fiber (not shown), and a large-diameter hole 43 continued from the narrow hole 42. The flange portion 41 is formed at an intermediate portion of each ferrule 4 in the optical axis directions X1 and X2. In the illustrated example, each ferrule 4 is formed by coupling two parts. Alternatively, each ferrule 4 may be formed as an integral part.

The housing 2 has a plate portion 21 at its one end. A part of the plate portion 21 is called a contact surface 22. The plate portion 21 is provided with a pair of through holes 23 through which the ferrules 4 are inserted. The housing 2 has an outer peripheral wall 24 provided with a hole 25 penetrating in a radial direction perpendicular to the optical axis directions X1 and X2. A part of a wall surface defining the hole 25 is called an engaging surface 26. The contact surface 22 and the engaging surface 26 are faced inward with respect to each other in the optical axis directions X1 and X2.

The shell 3 has a housing stopper 31 formed on its inner surface for locking the housing 2 in the optical axis direction X1. Movement of the housing 2 in the optical axis direction X2 is inhibited by a member (not shown) formed on the shell 3.

The stopper 5 is engaged with the housing 2 and the ferrules 4 as will presently be described. The stopper 5 comprises a main body 51 of a rectangular cylindrical shape, a pair of first engaging portions 52 which are elastically deformable and which are formed by cutting and bending on narrow opposite side portions of the main body 51, and four pairs of second engaging portions 53 each of which comprises an elastic plate elastically deformable and which protrude from wide upper and lower opposite surfaces of the main body 51. Each of the second engaging portions 53 has a free end 54 branched into two parts to form a generally U shape and is engaged with the flange portion 41 at two positions. Thus, the ferrules 4 are stably held so that the optical connector 1 can be improved in performance.

Each of the first engaging portions 52 has a first elastic plate 55 extending from the main body 51 towards the flange portion 41 of the ferrule 4 on one side, and a second elastic plate 56 extending from the first elastic plate 55 on the other side. The second elastic plate 56 protrudes outward from the first elastic plate 55 and enters into the hole 25 of the housing 2 to be engaged with the engaging surface 26. As a consequence, the stopper 5 is locked with the housing 2 in the optical axis direction X2.

As the ferrule 4, a general ferrule is desirably used in order to lower the cost of the optical connector 1. The ferrule 4 has an arc-shaped curved portion, i.e., an R portion 44 formed behind the flange portion 41. The R portion 44 has an outer peripheral portion kept in contact with a chamfered portion 45 of the flange portion 41. As described above, the free end 54 of each second engaging portion 53 of the stopper 5 is branched into two parts and is contacted at two positions with a planar portion 46 faced towards the optical axis direction X2.

The above-mentioned optical connector 1 has a structure in which the two ferrules 4 are held by the single stopper 5. Therefore, it is possible to narrow a pitch between the ferrules 4. Accordingly, the optical connector 1 can be reduced in size.

Next, the description will be made as regards assembling of the optical connector 1 mentioned above.

At first, the stopper 5 is attached to the housing 2 in the optical axis direction X1. Thereafter, the ferrules 4 are inserted, one by one or simultaneously, into the interior of the stopper 5 in the optical axis direction X1. At this time, the flange portion 41 of each ferrule 4 elastically deforms the second engaging portion 53 outward and the ferrule 4 is deeply inserted into the stopper 5. When the ferrule 4 is inserted to a predetermined position, the flange portion 41 is brought into contact with the contact surface 22 of the housing 2 so that further insertion is inhibited. The second engaging portion 53 is restored into an initial state and the free end 54 thereof is engageable with the flange portion 41. Thus, the ferrule 4 is inhibited from being retreated from the stopper 5.

In order to disengage the flange portion 41 from the free end 54 of the second engaging portion 53, a tool is used to elastically deform the second engaging portion 53 outward. In this state, the ferrule 4 is moved in the optical axis direction X1 to be retreated from the stopper 5.

Generally, once the stopper 5 is attached to the housing 2, the stopper 5 is not removed from the housing 2. However, if it is desired to remove the stopper 5, the tool is inserted into the hole 25 of the housing 2 to elastically deform the first engaging portion 52 of the stopper 5 inward so that the stopper 5 is disengaged from the contact surface 22. In this state, the stopper 5 is moved in the optical axis direction X1 and removed from the housing 2.

As described above, the stopper 5 is attached to the housing 2 by simply inserting the stopper 5 from a rear side of the housing 2. Thereafter, the ferrule 4 is simply inserted from a rear side of the stopper 5 to be held by the stopper 5. Thus, assembling of the optical connector 1 is easy. In case where the flange portion 41 of the ferrule 4 is disengaged from the second engaging portion 53 of the stopper 5 and in case where the first engaging portion 52 of the stopper 5 is released from contact with the contact surface 26 of the housing 2, such operation can easily be carried out simply by operating the tool.

Although this invention has been described in conjunction with the preferred embodiment thereof, this invention may be modified in various other manners. For example, the optical connector may be changed in design into a structure in which the single stopper 5 holds three or more ferrules 4. In the foregoing description, the main body 51 of the stopper 5 has a rectangular cylindrical shape. However, the main body 51 may have a cylindrical shape. The shell may be made of insulating material. The ferrule may be made of plastic material.

What is claimed is:

1. An optical connector comprising:
   a housing having a contact surface and an engaging surface faced inward with respect to each other in an optical axis direction;
   a ferrule having a flange portion brought into contact with the contact surface, the ferrule being adapted to receive an optical fiber; and
   a holding member coupled to the ferrule and attached to the housing,
   the holding member comprising:
   a cylindrical main body for receiving the ferrule inserted therein;
   a first engaging portion connected to the main body and engaged with the engaging surface; and
   a second engaging portion connected to the main body and engaged with the flange portion, the second engaging portion being elastically deformable.

2. The optical connector according to claim 1, further comprising a conductive shell surrounding the housing.

3. The optical connector according to claim 1, wherein the shell has a housing stopper engaged with the housing in the optical axis direction.

4. The optical connector according to claim 1, wherein the flange portion is disposed at an intermediate position of the ferrule in the optical axis direction, the housing having a plate portion provided with a through hole through which the ferrule is inserted, the plate portion having a part serving as the contact surface.

5. The optical connector according to claim 1, wherein the housing has a wall surface defining a hole penetrating the housing in a radial direction perpendicular to the optical axis direction, the wall surface having a part serving as the engaging surface.

6. The optical connector according to claim 5, wherein the first engaging portion has a first end coupled to the main body and a second end freely elastically deformable in the radial direction, the second end being engaged with the engaging surface.

7. The optical connector according to claim 6, wherein the first engaging portion comprises:
   a first elastic plate extending from the main body towards the flange portion; and
   a second elastic plate extending from the first elastic plate and engaged with the engaging surface.

8. The optical connector according to claim 1, wherein the second engaging portion has a first end connected to the main body and a second end having an elastic plate freely elastically deformable in the radial direction, the second end being engaged with the flange portion.

9. The optical connector according to claim 8, wherein the second end is branched into two parts and engaged with the flange portion at two positions.

10. The optical connector according to claim 8, wherein the elastic plate is disposed in correspondence to the ferrule.

* * * * *